United States Patent
Chou

(10) Patent No.: US 8,374,711 B2
(45) Date of Patent: Feb. 12, 2013

(54) METHOD AND RELATED APPARATUS FOR SELECTING AN AUDIO DATA SOURCE FOR A MULTIMEDIA DEVICE

(75) Inventor: Chih-Sheng Chou, Taoyuan County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 1100 days.

(21) Appl. No.: 12/330,485

(22) Filed: Dec. 8, 2008

(65) Prior Publication Data

US 2009/0271014 A1  Oct. 29, 2009

(30) Foreign Application Priority Data

Apr. 29, 2008  (TW) .............................. 97115702 A

(51) Int. Cl.
*G06F 17/00* (2006.01)
*G06F 11/00* (2006.01)
*H04B 15/00* (2006.01)
*H04B 17/02* (2006.01)

(52) U.S. Cl. .......... 700/94; 381/94.5; 455/135; 714/704

(58) Field of Classification Search ...................... 700/94; 381/73.1, 94.5; 340/2.1, 2.2, 2.9, 4.37, 4.4; 714/704, 706, 746, 2, 3, 6, 7; 455/132, 133, 455/135
See application file for complete search history.

(56) References Cited

U.S. PATENT DOCUMENTS

| | | | | |
|---|---|---|---|---|
| 5,271,011 A | * | 12/1993 | McMullan et al. | 714/708 |
| 5,446,922 A | * | 8/1995 | Siwiak et al. | 455/135 |
| 6,404,891 B1 | | 6/2002 | Seitz | |
| 7,133,478 B2 | | 11/2006 | Vierthaler | |
| 2004/0043730 A1 | * | 3/2004 | Schill et al. | 455/130 |
| 2006/0019601 A1 | * | 1/2006 | Kroeger et al. | 455/3.06 |

FOREIGN PATENT DOCUMENTS

TW  200746049  12/2007
TW  200818866  4/2008

* cited by examiner

*Primary Examiner* — Jesse Elbin
(74) *Attorney, Agent, or Firm* — Winston Hsu; Scott Margo

(57) ABSTRACT

A method for selecting an audio data source for a multimedia device includes detecting an error state of audio data for generating a detection result, wherein the audio data is generated by a digital source of the multimedia device, generating an initial counting value, generating a counting result according to the detection result and the initial counting value, confining the counting result within a boundary for generating a limit result, and comparing the limit result with a threshold for generating a comparison result, for selecting the audio data source of the multimedia device.

20 Claims, 3 Drawing Sheets

METHOD AND RELATED APPARATUS FOR SELECTING AN AUDIO DATA SOURCE FOR A MULTIMEDIA DEVICE

BACKGROUND OF THE INVENTION

1. Field of the Invention

The present invention relates to a method and a related apparatus for selecting an audio data source for a multimedia device, and more particularly, to a method and a related apparatus for switching to the audio data source according to a number of errors in the audio data.

2. Description of the Prior Art

A television is an important part of modern life. With the advancement of technology, the video and audio quality of televisions improves accordingly. Common audio standards for television broadcasting systems, such as A2/NICAM (Near Instantaneous Companded Audio Multiplex) in Europe, BTSC in North America, and EIA-J in Japan, are different from each other. A television broadcasting transmitter performs an analog modulation as AM/FM or a digital modulation as QPSK on audio data, for generating analog/digital modulated signals, and transmits analog/digital modulated signals to an end user, i.e. a television. Next, the television performs demodulation on received audio signals according to the selected audio standard and plays the audio data.

Analog modulated signals are often accompanied by noise that is difficult to cancel during transmission, which results in a bad audio quality. Noise cancellation for digital modulated signals, however, is easy to do because digital modulated signals are protected by an encoding process, and therefore an audio quality of digital modulated signals is usually better than that of analog modulated signals. The audio quality of digital modulated signals declines much more quickly, however, when a signal quality is worse than an acceptable level. In this situation, a television user may hear an uncomfortable "popping" noise when playing the audio data demodulated from digital modulated signals of bad signal quality.

For a television using A2/NICAM standard, audio data sources of the television include a digital source for playing digital modulated signals and an analog source for playing analog modulated signals. When a signal quality is worse than the acceptable level, the television switches an audio data source from the digital source to the analog source or to a mute mode. A prior art method for switching an audio data source periodically detects a bit error rate (BER) of audio signals via a timer and compares the BER with a threshold. When the BER is higher than the threshold, the television switches from the digital source to the analog source or to a mute mode, for avoiding the popping noise.

The prior art method cannot be used to switch to the appropriate audio data source in time, however, because the television detects the BER periodically. When the signal quality declines quickly between two detecting points, the television does not switch from the digital source to the analog source and the television user will hear the popping noise. Thus the audio quality of the television declines.

SUMMARY OF THE INVENTION

It is therefore a primary objective of the claimed invention to provide a method and a related apparatus for selecting an audio data source for a multimedia device, for switching to the audio data source according to a signal quality of audio data.

The present invention discloses a method for selecting an audio data source for a multimedia device. The method comprises detecting an error state of audio data for generating a detection result, wherein the audio data is generated by a digital source of the multimedia device, generating an initial counting value, generating a counting result according to the detection result and the initial counting value, confining the counting result within a boundary for generating a limit result, and comparing the limit result with a threshold for generating a comparison result, for selecting the audio data source of the multimedia device.

The present invention further discloses an electronic device for selecting an audio data source for a multimedia device, which comprises an error detector, a multiplexer, a counter, a limiter and a comparator. The error detector is utilized for detecting an error state of audio data for generating a detection result, wherein the audio data is generated by a digital source of the multimedia device. The multiplexer is utilized for generating an initial counting value. The counter is coupled to the error detector and the multiplexer and is utilized for generating a counting result according to the detection result and the initial counting value. The limiter is coupled to the counter and is utilized for confining the counting result within a boundary for generating a limit result. The comparator is coupled to the limiter and is utilized for comparing the limit result with a threshold for generating a comparison result, for selecting the audio data source of the multimedia device.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method for selecting an audio data source in time according to an audio signal quality. The present invention is not limited to be used in televisions and can be applied to any multimedia device which receives audio signals including digital modulated signals and analog modulated signals.

Figure 1:
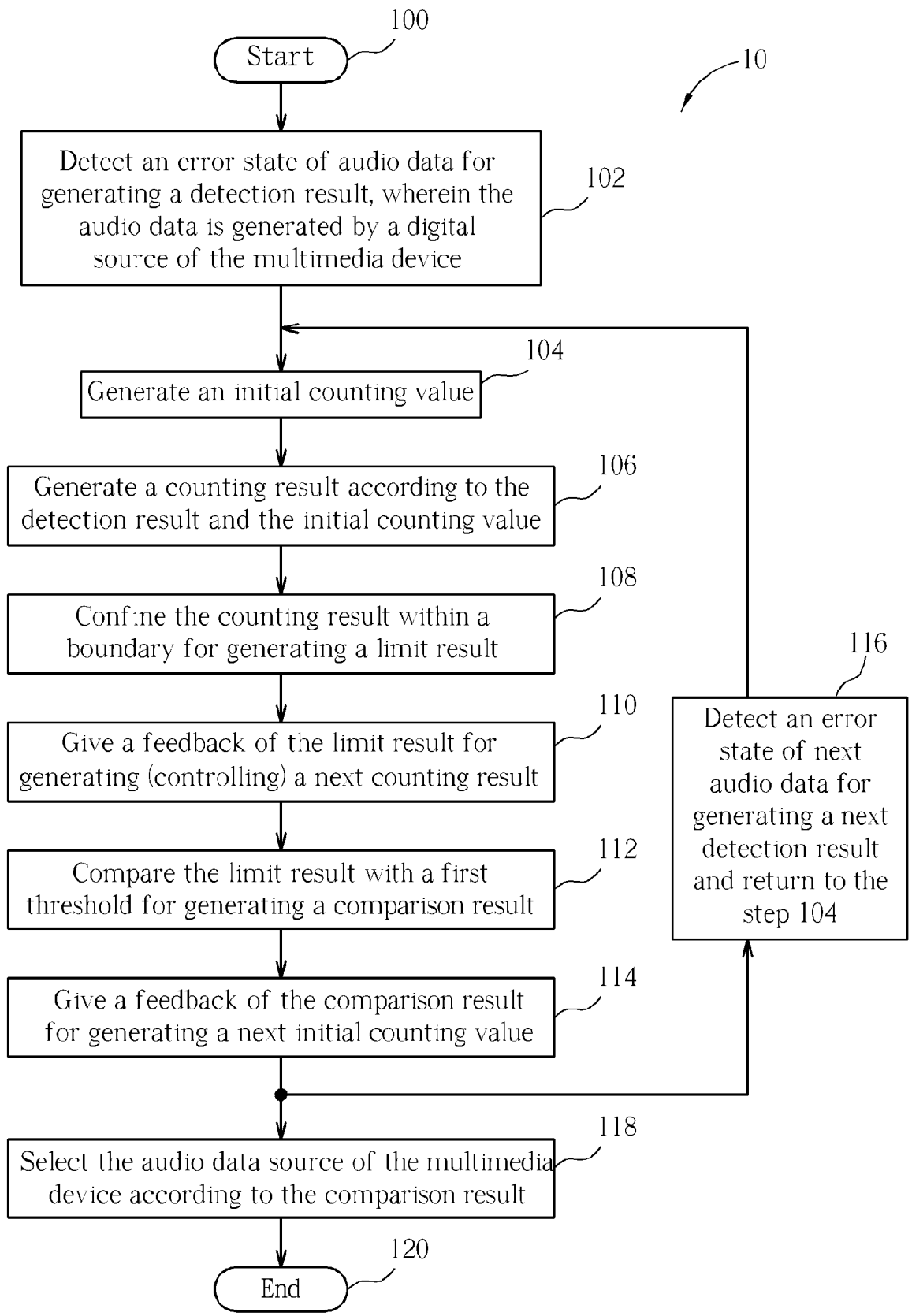
FIG. 1 is a flowchart of a process according to an embodiment of the present invention.

Please refer to FIG. 1, which is a flowchart of a process 10 according to an embodiment of the present invention. The process 10 is utilized in a multimedia device for selecting an audio data source of the multimedia device. The multimedia device, such as a television, is a receiver for receiving audio signals including digital modulated signals and analog modulated signals. The digital modulated signals carry the same audio data as the analog modulated signals carry. The multimedia device has to select the audio data source from the digital source and the analog source for playing audio data. The process 10 comprises the following steps:

Step 100: Start.

Step 102: Detect an error state of audio data for generating a detection result, wherein the audio data is generated by a digital source of the multimedia device.

Step 104: Generate an initial counting value.

Step 106: Generate a counting result according to the detection result and the initial counting value.

Step 108: Confine the counting result within a boundary for generating a limit result.

Step 110: Give a feedback of the limit result for generating (controlling) a next counting result.

Step 112: Compare the limit result with a first threshold for generating a comparison result.

Step 114: Give a feedback of the comparison result for generating a next initial counting value.

Step 116: Detect an error state of next audio data for generating a next detection result and return to the step 104.

Step 118: Select the audio data source of the multimedia device according to the comparison result.

Step 120: End.

In the process 10, the audio data derived from digital modulated signals are generated by a digital source. First of all, the multimedia device detects the error state of the audio data for generating the detection result. For example, the multimedia device uses an error-detecting code, such as a cyclic redundancy check (CRC) or a parity check, to detect errors in the audio data. The detection result shows whether the audio data is correct or incorrect. At the same time, the multimedia device generates the initial counting value according to a previous detection result.

Next, the multimedia device generates the counting result according to the detection result and the initial counting value. Preferably, when the detection result shows that the audio data is incorrect, the multimedia device adds a first value to the initial counting value to generate the counting result. When the detection result shows that the audio data is correct, the multimedia device subtracts a second value from the initial counting value to generate the counting result. Note that the first value and the second value are weightings for incorrect and correct audio data and can be different values. For example, let the initial counting value be 5, the first value be 3 and the second value be 1. When the detection result shows that the audio data is incorrect, the counting result is 5+3=8; and when the detection result shows that the audio data is correct, the counting result is 5−1=4. In other words, the counting result will increase quickly if the multimedia device detects errors continuously occurring in the audio data. Therefore, the embodiment of the present invention makes the multimedia device more sensitive to errors in the audio data.

Next, the multimedia device confines the counting result within the boundary for generating a limit result. The boundary is decided by an upper bound and a lower bound and is used for avoiding counting overflow. When the counting result is within the boundary, the multimedia device controls the limit result to be equal to the counting result and does not do anything to the counting result. When the counting result is equal to or greater than the upper bound, however, the multimedia device controls the limit result to be equal to the upper bound; and when the counting result is equal to or smaller than the lower bound, the multimedia device controls the limit result to be equal to the lower bound. Next, the multimedia device gives a feedback of the limit result for generating (controlling) the next counting result. In detail, when the limit result is equal to the upper bound, it means that the counting result overflows and the multimedia device will stop increasing the next counting result. That is, even if the next detection result shows that the audio data is incorrect, the next counting result will not be increased. On the other hand, when the limit result is equal to the lower bound, it means that the counting result also overflows and the multimedia device will stop decreasing the next counting result. That is, even if the next detection result shows that the audio data is correct, the next counting result will not be decreased.

At the same time, the multimedia device compares the limit result with the first threshold for generating the comparison result. The first threshold is utilized for determining whether the multimedia device switches to the audio data source. When the comparison result shows that the limit result is smaller than the first threshold, the multimedia device selects the digital source to play the audio data, which means the multimedia device does not change the audio data source. On the other hand, when the comparison result shows that the limit result is equal to or greater than the first threshold, the multimedia device selects the analog source to play the audio data or selects the mute mode. Therefore, the multimedia device can switch from the digital source to the analog source or the mute mode when the signal quality is poor. Thus the user of the multimedia device will not hear an obvious popping noise.

In addition, the multimedia device gives the feedback of the comparison result for generating the next initial counting value. Preferably, when the comparison result shows that the limit result is greater than the first threshold, the multimedia device adds a third value to the limit result to generate the next initial counting value. Note that adding the third value makes the multimedia device take longer to decrease from the next initial counting value to be under the first threshold. In other words, after the multimedia device switches to the analog source or the mute mode, the multimedia device has to wait longer for ensuring that the signal quality is acceptable and then switches back to the digital source. For example, let the counting value be 8, the upper bound be 15, the lower bound be 0, the first threshold be 7 and the third value be 3. The counting value, 8, is in the boundary, so that the limit result is equal to 8. Next, the limit result, 8, is greater than the first threshold, 7, so the multimedia device switches to the analog source or the mute mode. In addition, the next initial counting value is 8+3=11.

According to the step 118, the multimedia device switches to the analog source or the mute mode when the comparison result shows that the limit result is equal to or greater than the first threshold, and the multimedia device switches back to the digital source when the comparison result shows that the next limit result is smaller than the first threshold. Note that the process 10 is an embodiment of the present invention, and those skilled in the art can make alterations and modifications accordingly. For example, another embodiment of the present invention can define a second threshold different from the first threshold. The multimedia device can switch back to the digital source only when the comparison result shows that the next limit result is smaller than the second threshold. Alternatively, according to the step 116, the multimedia device detects the error state of the next audio data for generating the next detection result and returns to the step 104 for continuously detecting whether the audio data is correct. Note that the multimedia device performs the step 116 and the step 118 at the same time.

In the prior art, the multimedia device periodically detects a bit error rate of audio signals via a timer and compares the bit error rate with a threshold, for deciding whether the multimedia device switches to an appropriate audio data source. In comparison, the embodiment of the present invention selects an appropriate audio data source in time by detecting errors in the audio data and transforming the number of errors to an accumulative counting result.

Figure 2:
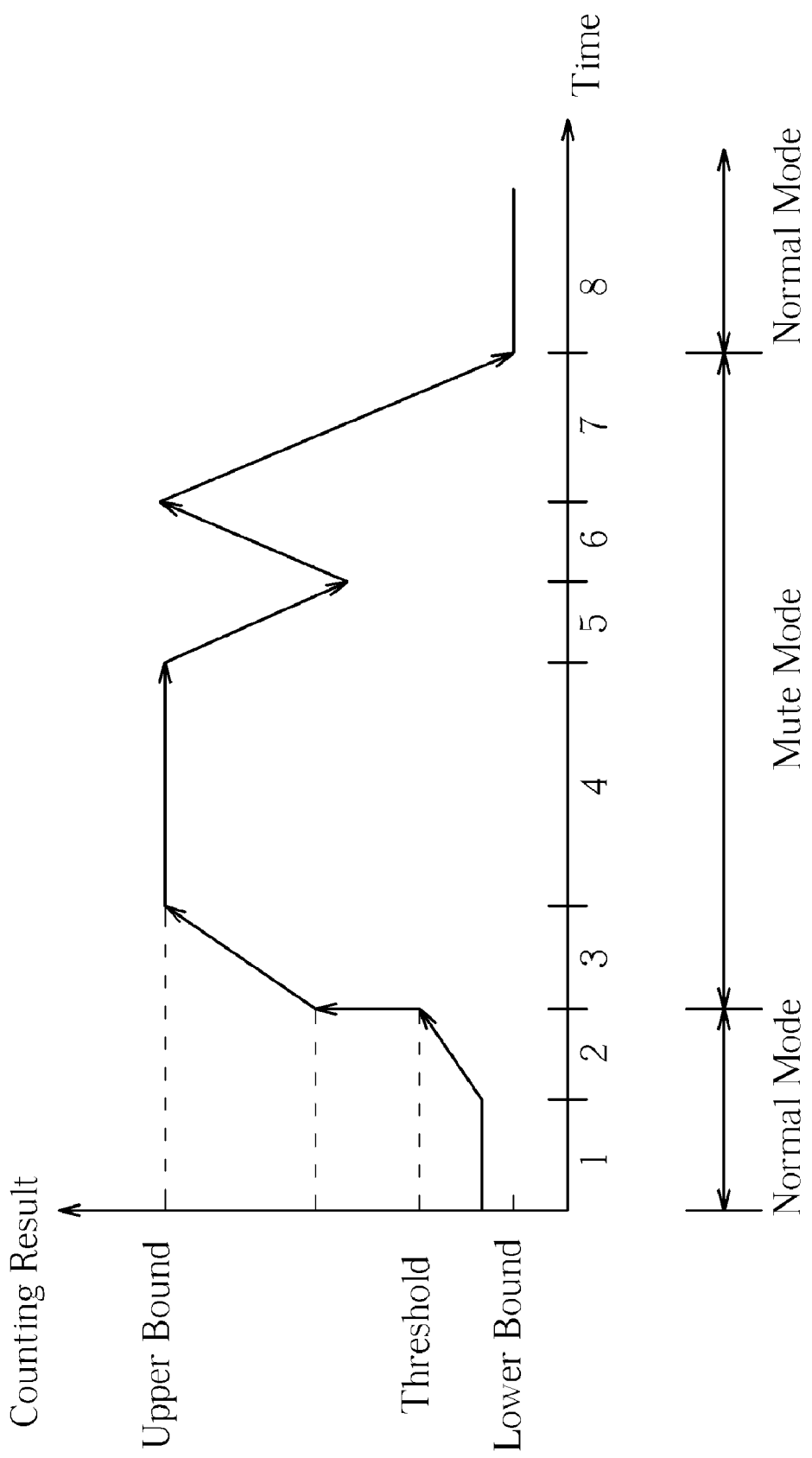
FIG. 2 is a schematic diagram of the variation of a counting result in the process shown in FIG. 1.

In addition, please refer to FIG. 2, which is a schematic diagram of the variation of the counting result in the process 10. The counting result varies according to the error state of the audio data. All time intervals 1 to 8 in FIG. 2 are described as follows:

Time 1: There is no error detected. The initial counting value is equal to the lower bound and the counting result is not changed. The multimedia device is in a normal mode in which the audio data source is the digital modulated source.

Time 2: There are data errors detected. During T2, the counting result is increasing and the multimedia device is in a normal mode. At the boundary between T2 and T3, the counting result reaches the first threshold so the multimedia device adds the third value to the limit result to generate the next initial counting value.

Time 3: The multimedia device switches to the mute mode or the analog source. There are data errors detected and finally, the counting result reaches the upper bound.

Time 4: There are data errors detected. The counting result has already reached the upper bound so that the multimedia device stops increasing the counting result. The multimedia device is in the mute mode or the analog source mode.

Time 5: There is no error detected. The multimedia device keeps decreasing the counting result and is still in the mute mode or the analog source mode.

Time 6: There are data errors detected. The multimedia device keeps increasing the counting result and is still in the mute mode or the analog source mode.

Time 7: There is no error detected. The multimedia device keeps decreasing the counting result but the counting result does not reach the second threshold yet. The multimedia device is still in the mute mode or the analog source mode.

Time 8: The counting result reaches the second threshold at the boundary between T7 and T8, and thereby the multimedia device is back to the normal mode. Note that the second threshold is also the lower bound of the counting result so that the multimedia device stops decreasing the counting result.

Figure 3:
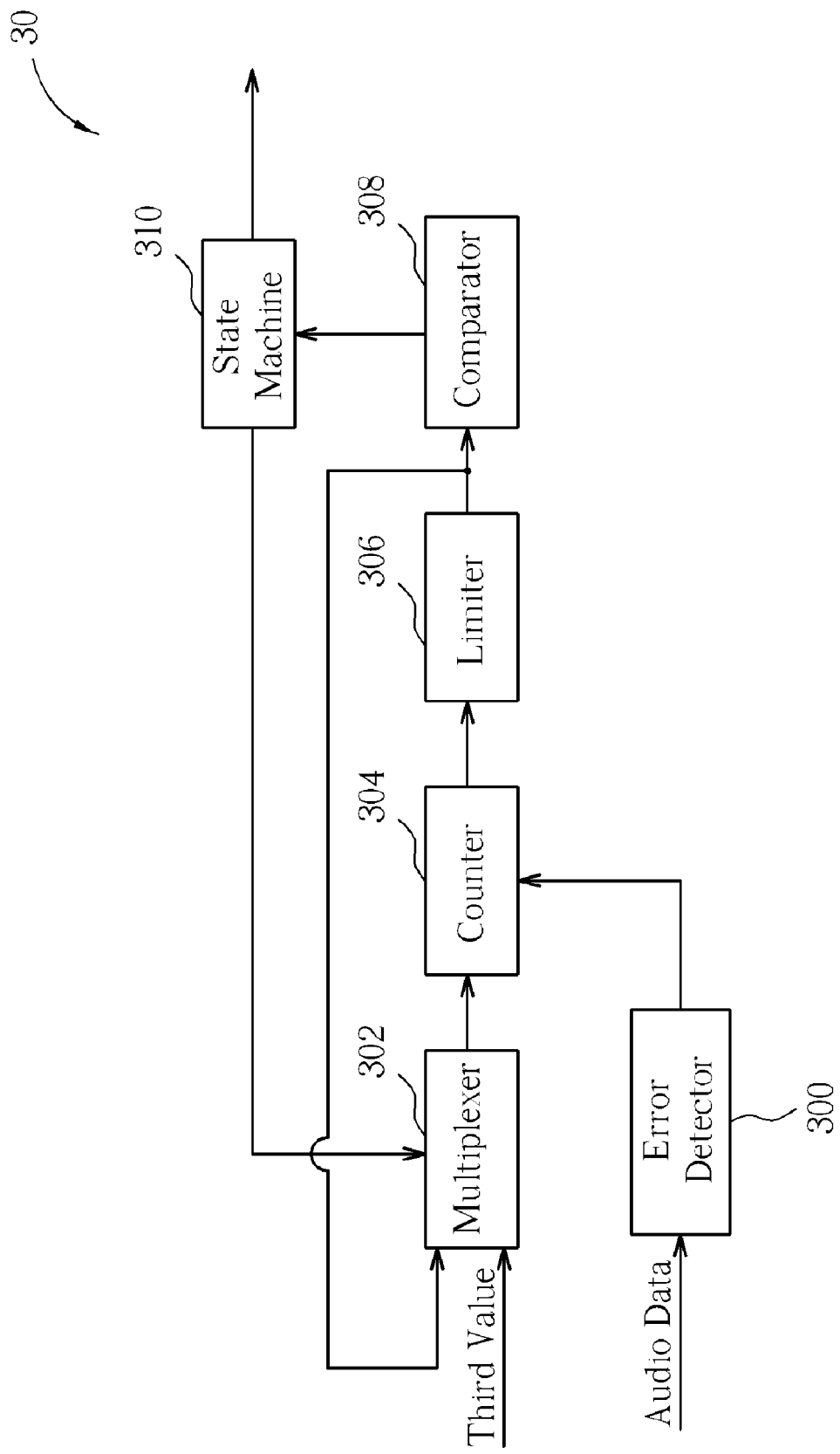
FIG. 3 is a functional block diagram of an electronic device according to an embodiment of the present invention.

Please refer to FIG. 3 for the implementation of the process 10. FIG. 3 is a functional block diagram of an electronic device 30 according to an embodiment of the present invention. The electronic device 30 is utilized in a multimedia device for selecting an audio data source of the multimedia device. The electronic device 30 comprises an error detector 300, a multiplexer 302, a counter 304, a limiter 306, a comparator 308 and a state machine 310. The error detector 300 is utilized for detecting the error state of the audio data for generating the detection result, wherein the audio data is generated by the digital source of the multimedia device. The multiplexer 302 is utilized for generating the initial counting value. The counter 304 is coupled to the error detector 300 and the multiplexer 302, and is utilized for generating the counting result according to the detection result and the initial counting value. The limiter 306 is coupled to the counter 304 and the multiplexer 302, and is utilized for confining the counting result within the boundary for generating the limit result and giving the feedback of the limit result to the multiplexer 302. The comparator 308 is coupled to the limiter 306 and is utilized for comparing the limit result with the first threshold for generating the comparison result. The state machine 310 is coupled to the comparator 308 and the multiplexer 302 and is utilized for selecting the audio data source of the multimedia device according to the comparison result and giving the feedback of the comparison result to the multiplexer 302.

The multiplexer 302 receives the feedback of the limit result from the limiter 306 and the feedback of the comparison result from the state machine 310. When the counting result reaches the upper bound or the lower bound of the boundary of the limiter 306, the multiplexer 302 controls the counter 304 to stop increasing or decreasing the counting result. On the other hand, when the comparison result shows that the limit result is equal to or greater than the first threshold, the multiplexer 302 adds the third value on the limit result to generate the next initial counting value. The detailed operations of the electronic device 30 are described in the process 10 as above and are not given here. In other words, the electronic device 30 is utilized for detecting the number of errors in the audio data in time, for controlling the multimedia device to switch to the appropriate audio data resource. Therefore, the multimedia device switches to the appropriate audio data resource via the electronic device 30 when the signal quality is poor, for avoiding the popping noise that accompanies digital modulated signals.

In conclusion, when the signal quality is poor, the embodiment of the present invention controls the multimedia device to switch from the digital source to the analog source or the mute mode in sufficient time. Therefore, the audio quality of the multimedia device is enhanced and the user of the multimedia device will not hear an obvious popping noise.

Those skilled in the art will readily observe that numerous modifications and alterations of the device and method may be made while retaining the teachings of the invention.

What is claimed is:

1. A method for selecting an audio data source for a multimedia device comprising:
   detecting an error state of audio data for generating a detection result, wherein the audio data is generated by a digital source of the multimedia device;
   generating an initial counting value;
   generating a counting result according to the detection result and the initial counting value;
   confining the counting result within a boundary for generating a limit result;
   comparing the limit result with a threshold for generating a comparison result, for selecting the audio data source of the multimedia device;
   giving a feedback of the comparison result for generating a next initial counting value; and
   adding a third value to the limit result to generate the next initial counting value when the comparison result shows that the limit result is greater than the threshold.

2. The method of claim 1, wherein the step of generating the counting result according to the detection result and the initial counting value comprises adding a first value to the initial counting value to generate the counting result when the detection result shows that the audio data is incorrect.

3. The method of claim 1, wherein the step of generating the counting result according to the detection result and the initial counting value comprises subtracting a second value from the initial counting value to generate the counting result when the detection result shows that the audio data is correct.

4. The method of claim 1, wherein the step of confining the counting result within the boundary for generating the limit result comprises controlling the limit result to be equal to a upper bound of the boundary when the counting result is equal to or greater than the upper bound.

5. The method of claim 4 further comprising giving a feedback of the limit result for stopping increasing a next counting result.

6. The method of claim 1, wherein the step of confining the counting result within the boundary for generating the limit result comprises controlling the limit result to be equal to a lower bound of the boundary when the counting result is equal to or smaller than the lower bound.

7. The method of claim 6 further comprising giving a feedback of the limit result for stopping decreasing a next counting result.

8. The method of claim 1, wherein the step of comparing the limit result with the threshold for generating the comparison result, for selecting the audio data source of the multimedia device comprises controlling the multimedia device to select the digital source when the comparison result shows that the limit result is smaller than the threshold.

9. The method of claim 1, wherein the step of comparing the limit result with the threshold for generating the comparison result, for selecting the audio data source of the multimedia device comprises controlling the multimedia device to select an analog source when the comparison result shows that the limit result is equal to or greater than the threshold.

10. The method of claim 1, wherein the step of comparing the limit result with the threshold for generating the comparison result for selecting the audio data source of the multimedia device comprises controlling the multimedia device to select a mute mode when the comparison result shows that the limit result is equal to or greater than the threshold.

11. An electronic device for selecting an audio data source for a multimedia device comprising:
- an error detector for detecting an error state of audio data for generating a detection result, wherein the audio data is generated by a digital source of the multimedia device;
- a multiplexer for generating an initial counting value;
- a counter coupled to the error detector and the multiplexer, for generating a counting result according to the detection result and the initial counting value;
- a limiter coupled to the counter, for confining the counting result within a boundary for generating a limit result;
- a comparator coupled to the limiter, for comparing the limit result with a threshold for generating a comparison result for selecting the audio data source of the multimedia device; and
- a state machine coupled to the multiplexer and the comparator, for outputting the comparison result to the multiplexer for generating a next initial counting value;
- wherein the multiplexer is further utilized for adding a third value to the limit result for generating the next initial counting value when the comparison result shows that the limit result is greater than the threshold.

12. The electronic device of claim 11, wherein the counter is utilized for adding a first value to the initial counting value to generate the counting result when the detection result shows that the audio data is incorrect.

13. The electronic device of claim 11, wherein the counter is utilized for subtracting a second value from the initial counting value to generate the counting result when the detection result shows that the audio data is correct.

14. The electronic device of claim 11, wherein the limiter is utilized for controlling the limit result to be equal to a upper bound of the boundary when the counting result is equal to or greater than the upper bound.

15. The electronic device of claim 14, wherein the multiplexer is further coupled to the limiter and is utilized for stopping increasing the counter when the counting result reaches the upper bound.

16. The electronic device of claim 11, wherein the limiter is utilized for controlling the limit result to be equal to a lower bound of the boundary when the counting result is equal to or smaller than the lower bound.

17. The electronic device of claim 16, wherein the multiplexer is further coupled to the limiter and is utilized for stopping decreasing the counter when the counting result reaches the lower bound.

18. The electronic device of claim 11, wherein the state machine is further utilized for controlling the multimedia device to select the digital source when the comparison result shows that the limit result is smaller than the threshold.

19. The electronic device of claim 11, wherein the state machine is further utilized for controlling the multimedia device to select an analog source when the comparison result shows that the limit result is equal to or greater than the threshold.

20. The electronic device of claim 11, wherein the state machine is further utilized for controlling the multimedia device to select a mute mode when the comparison result shows that the limit result is equal to or greater than the threshold.

* * * * *